Patented July 9, 1946

2,403,723

UNITED STATES PATENT OFFICE 2,403,723

PREPARATION OF 1,2,4-OXADIAZOLES

Donald W. Kaiser, Riverside, Conn., assignor to American Cyanamid Company, New York, N. Y., a corporation of Maine No Drawing. Application June 23, 1944, Serial No. 541,845

7 Claims. (Cl. 260—307)

This invention relates to new organic compounds, novel reaction products thereof, and to methods of preparing the same.

I have discovered that when 3-alkyl, cycloalkyl, and aryl-5-ureido-1,2,4-oxadiazoles are hydrolyzed by heating with an acid or alkali in a suitable liquid reaction medium containing at least a small amount of water, a reaction takes place in accordance with the following equation:

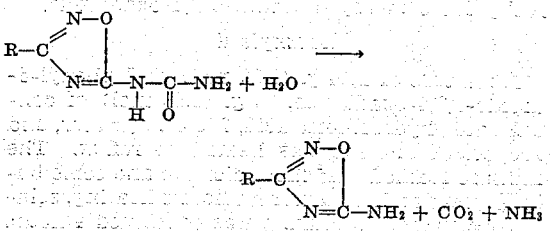

In the formulas R is an alkyl, cycloalkyl, or aryl radical. The products of the reaction, 3-alkyl, cycloalkyl, and aryl-5-amino-1,2,4-oxadiazoles, are new compounds and form the principal subject matter of the present invention. The 5-amino group is very easily hydrolyzed to a —OH group, and the resulting compounds, 3-alkyl, cycloalkyl, and aryl-5-hydroxy-1,2,4-oxadiazoles, are also new compounds and are included within the purview of the present invention. These latter compounds are easily formed upon continued hydrolysis of the reaction mixture.

The hydrolysis of 3-alkyl, cycloalkyl, and aryl-5-ureido-1,2,4-oxadiazoles may take place at temperatures between about 25° C. and 125° C. in an alkaline or acidic reaction medium comprising water. A convenient method of conducting the reaction is to mix the reactants in a suitable solvent or diluent and heat the reaction mixture under a reflux condenser until the reaction is complete. This may be determined by trapping the ammonia evolved from the reaction mixture and determining the amount so evolved until a theoretical quantity has been liberated. This procedure is illustrated in one of the specific examples hereinafter described.

The time required to complete the reaction may be from about 1 hour to about 30 hours or more depending upon the temperature of the reaction and the nature of the acid or alkali employed as the hydrolyzing agent.

A suitable solvent for the reactants may be water alone or ethanol, methanol, butanol, dioxane, Cellosolve, or other water-miscible solvent, or a mixture of these solvents with each other or with water. It will be understood, of course, that enough water is present to enable the hydrolysis to take place as indicated by the equation above. Although I usually dissolve the reactants before heating the reaction mixture, it is not necessary that they be completely dissolved, as solution will take place a short time after the reaction has started.

The 3-alkyl, cycloalkyl, and aryl-5-ureido-1,2,4-oxadiazoles which are used as intermediates in the present invention can be prepared by heating together an acyl dicyandiamide and hydroxylamine, as shown in Example 1. The acyl dicyandiamides are in turn prepared by simply mixing dicyandiamide with a desired acyl halide or anhydride in a water-soluble alkali metal hydroxide in the presence of a small amount of water and a non-hydroxylated solvent such as acetone.

A great number of 3-alkyl, cycloalkyl, and aryl-5-ureido-1,2,4-oxadiazoles can be employed in the reaction described herein to produce the new compounds of the present invention. Among these may be specifically mentioned: 3-methyl-5-ureido-1,2,4-oxadiazole, 3-n-butyl-5-ureido-1,2,4-oxadiazole, 3-isoamyl-5-ureido-1,2,4-oxadiazole, 3-dodecyl-5-ureido-1,2,4-oxadiazole, 3-octadecyl-5-ureido-1,2,4-oxadiazole, 3-($\alpha$-bromamyl)-5-ureido-1,2,4-oxadiazole, 3-hexyl-5-ureido-1,2,4-oxadiazole, 3-($\omega$-hydroxydecyl)-5-ureido-1,2,4-oxadiazole, 3-phenyl-5-ureido-1,2,4-oxadiazole, 3-(p-nitrophenyl)-5-ureido-1,2,4-oxadiazole, 3-(o-carboxyphenyl)-5-ureido-1,2,4-oxadiazole, 3-(p-hydroxyphenyl)-5-ureido-1,2,4-oxadiazole, 3-cyclohexyl-5-ureido-1,2,4-oxadiazole, and other alkyl, cycloalkyl, and aryl-5-ureido-1,2,4-oxadiazoles.

Almost any commonly used acidic or alkaline hydrolyzing agent may be used in the process described herein. Among such conventional hydrolyzing agents are sodium hydroxide, potassium hydroxide, ammonium hydroxide, sodium carbonate, potassium carbonate, barium hydroxide, etc., and sulfuric acid, hydrochloric acid, acetic acid, nitric acid, phosphoric acid, etc. Since the use of acidic and alkaline hydrolyzing agents is well understood by those in the art, further description thereof would appear to be unnecessary.

The 3-alkyl, cycloalkyl, and aryl-5-amino-1,2,4-oxadiazoles of the present invention are generally characterized as being basic, white crystalline solids, easily to slightly soluble in water depending upon the nature of the 3-substituent. In general, they are not easily soluble in organic solvents but may be dissolved in small amounts in Cellosolve, aliphatic alcohols, pyridine, dioxane, etc. They melt or decompose at high temperatures, their melting points being somewhat dependent upon the manner in which they are determined. The 3-alkyl, cycloalkyl, and aryl-5-amino-1,2,4-oxadiazoles are useful for a variety of purposes including: as dyestuff intermediates, in the preparation of chemotherapeutic agents, in the preparation of quaternary ammonium compounds, and the like.

The 3-alkyl, cycloalkyl, and aryl-5-hydroxy-1,2,4-oxadiazoles are somewhat similar in physical properties to the 5-amino-oxadiazoles but are characterized as being slightly more soluble in water and having a higher melting or decomposition point.

As previously stated, the 5-amino-oxadiazoles are easily converted to the corresponding 5-hydroxy-oxadiazoles upon continued hydrolysis, and care must be exercised in the initial hydrolysis if good yields of the 5-amino oxadiazoles are to be obtained. Also, as previously mentioned, the course of the reaction may be followed and stopped at the required point by observing the amount of ammonia evolved from the reaction mixture. Continued hydrolysis results in elimination of an additional mole of ammonia through replacement of the 5-amino group by a hydroxy group in the presence of water.

My invention will now be illustrated in greater detail by means of the following specific examples which are given for purposes of illustration and are not to be considered as limiting my invention to the particular details described therein.

*Example 1*

To a suspension of 131.6 g. of benzoyl dicyandiamide in 1500 cc. of water was added a solution of 59 g. of hydroxylamine hydrochloride in 1500 cc. of water. The mixture was stirred and heated and an additional 500 cc. of water added. After refluxing 30 minutes, the mixture was cooled and the colorless solid filtered, washed with water, and dried. On analysis it proved to be 3-phenyl-5-ureido-1,2,4-oxadiazole.

To a solution of 33 g. (0.50 mol) of 85% potassium hydroxide in 250 cc. of water was added 40.8 g. (0.20 mol) of 3-phenyl-5-ureido-1,2,4-oxadiazole. On heating to reflux, solution occurred, and ammonia began to be evolved. After 2 hours of heating, Nuchar was added to the light yellow solution, and it was then filtered. Cooling of the nearly colorless filtrate gave a small quantity of long needles which melted at 160–162° C. Crystallization from a large volume of hot water gave slender, beautiful needles which melted at 164–165° C. and which analyzed correctly for 3-phenyl-5-amino-1,2,4-oxadiazole. This compound was soluble in acid, reprecipitated by alkali, and insoluble in excess alkali. When a portion was dissolved in water which contained silver nitrate, addition of a drop of ammonia precipitated a light yellow, amorphous, silver salt which decomposed at 192° C.

Addition of acetic acid to the original alkaline filtrate, obtained from the reaction immediately above, precipitated 20 g. of colorless solid which decomposed at 188–190° C. Crystallization from a large volume of water which contained a little methanol raised the decomposition point to 197–198° C. The material was alkali soluble, reprecipitated by acids, and insoluble in excess acid. Analysis was in good agreement for 3-phenyl-5-hydroxy-1,2,4-oxadiazole.

*Example 2*

In a further experiment using barium hydroxide in place of potassium hydroxide the mixture was refluxed for 17 hours. After separating the barium carbonate which had formed in the reaction mixture, 3-phenyl-5-amino-1,2,4-oxadiazole was recovered. No 3-phenyl-5-hydroxy-1,2,4-oxadiazole was obtained when using this mild hydrolyzing agent under the conditions of this experiment.

*Example 3*

A solution of 32.5 g. of 97% barium hydroxide octahydrate in 250 cc. of hot water was filtered and added to 24.4 g. of 3-methyl-5-ureido-1,2,4-oxadiazole in a 1-liter flask fitted with a stirrer, nitrogen bubbling tube, and a condenser leading to a safety bottle and finally to an absorption flask containing 80 cc. of 2.5 N hydrochloric acid. A stream of nitrogen was passed into the reaction mixture as the mixture was refluxed gently. The rate and extent of reaction was followed by titrating the acid solution to determine the amount of ammonia evolved and by weighing the barium carbonate precipitated during the reaction. The reaction was completed in 4 hours and 15 minutes. The reaction mixture was filtered and cooled in an ice bath to precipitate a white solid. By continuous ether extraction of this solid and the mother liquor a total of 11.2 g. of glassy needles melting at 160–162° C. was obtained. By recrystallizing a sample of 1 g. of this product from 200 cc. of ether, a sample melting at 163–164° C. was obtained which analyzed correctly for 3-methyl-5-amino-1,2,4-oxadiazole.

*Example 4*

A mixture of 20.4 g. (0.10 mol) of 3-phenyl-5-ureido-1,2,4-oxadiazole, 60 g. (0.60 mol) of concentrated hydrochloric acid, 250 cc. of water, and 100 cc. of dioxane was heated to reflux. The mixture foamed, and more dioxane and some butanol were added. After an hour's heating, solution occurred. Refluxing was continued 4 hours longer. The brown solution was clarified with Nuchar, and the filtrate evaporated on a steam bath. A residue of brown liquid and solid remained. Concentrated hydrochloric acid was added and the solid filtered, washed with more acid, and allowed to dry. The material weighed 6.0 g. and decomposed at 188–190° C. Crystallization from hot water raised the decomposition point to 197–198° C., and fusion with the previously isolated 3-pheny-5-hydroxy-1,2,4-oxadiazole of the same melting point gave no depression of the melting temperature. In this example the hydrolysis was more drastic, the starting material being converted first into 3-phenyl-5-amino-1,2,4-oxadiazole and then to 3-phenyl-5-hydroxy-1,2,4-oxadiazole without isolation of the former as in Examples 1 and 3.

I claim:

1. A method of preparing compounds having the following structural formula

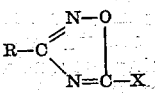

in which R is a member of the group consisting of alkyl, cycloalkyl, and aryl radicals, and X is a member of the group consisting of amino and hydroxy radicals which comprises the step of heating in the presence of a hydrolyzing agent a compound having the formula

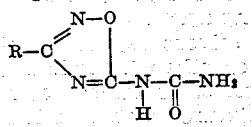

in which R is as defined above.

2. A method of preparing 3-alkyl-5-amino-1,2,4-oxadiazoles which comprises heating in the presence of a hydrolyzing agent a 3-alkyl-5-ureido-1,2,4-oxadiazole.

3. A method of preparing 3-aryl-5-amino-1,2,4- oxadiazoles which comprises heating in the presence of a hydrolyzing agent a 3-aryl-5-ureido-1,2,4-oxadiazole.

4. A method of preparing 3-alkyl-5-amino-1,2,4-oxadiazoles which comprises heating at a temperature within the range of 25–125° C. in the presence of water and an alkali a 3-alkyl-5-ureido-1,2,4-oxadiazole.

5. A method for preparing 3-alkyl-5-amino-1,2,4-oxadiazoles which comprises heating at a temperature within the range of 25–125° C. in the presence of water and an acid a 3-alkyl-5-ureido-1,2,4-oxadiazole.

6. A method of preparing 3-aryl-5-amino-1,2,4-oxadiazoles which comprises heating at a temperature within the range of 25–125° C. in the presence of water and an alkali a 3-aryl-5-ureido-1,2,4-oxadiazole.

7. A method of preparing 3-aryl-5-amino-1,2,4-oxadiazoles which comprises heating at a temperature within the range of 25–125° C. in the presence of water and barium hydroxide a 3-aryl-5-ureido-1,2,4-oxadiazole.

DONALD W. KAISER.